United States Patent [19]

Yoshioka

[11] Patent Number: 5,675,561

[45] Date of Patent: Oct. 7, 1997

[54] OPTICAL DISC REPRODUCING APPARATUS WITH MECHANICAL SHOCK DETECTION

[75] Inventor: You Yoshioka, Kanagawa-ken, Japan

[73] Assignee: Kabushiki Kaisha Toshiba, Kawasaki, Japan

[21] Appl. No.: 593,626

[22] Filed: Jan. 30, 1996

[30] Foreign Application Priority Data

Jan. 30, 1995 [JP] Japan .................................. 7-013165

[51] Int. Cl.$^6$ .................................................. G11B 7/095
[52] U.S. Cl. ............................ 369/44.25; 369/44.29; 369/44.32; 369/44.35
[58] Field of Search ......................... 369/44.25, 44.29, 369/44.35, 44.36, 44.41, 44.27, 44.32, 54; 250/201.5

[56] References Cited

U.S. PATENT DOCUMENTS

| 4,541,084 | 9/1985 | Oku et al. ................... | 369/44.25 |
| 4,733,066 | 3/1988 | Komo et al. ................. | 369/44.29 |
| 4,769,801 | 9/1988 | Funada et al. ............... | 369/44.29 |
| 5,060,215 | 10/1991 | Kawamura et al. .......... | 369/44.35 |
| 5,361,246 | 11/1994 | Tominaga ..................... | 369/44.22 |

FOREIGN PATENT DOCUMENTS

| 0 587 350 | 3/1994 | European Pat. Off. . |
| 2 149 938 | 6/1985 | United Kingdom . |

*Primary Examiner*—Thang V. Tran
*Attorney, Agent, or Firm*—Cushman, Darby & Cushman IP Group of Pillsbury Madison & Sutro LLP

[57] ABSTRACT

An optical disc reproducing apparatus of the present invention has an objective lens for focusing light from the light source on a disc surface as a light spot, a focus actuator for driving the objective lens in the vertical direction to the disc surface, a light detector for converting the reflected light from the disc surface into electric signal, a focus error signal generator for generating a focus error signal representing a vertical deviation of the focal point from the disc surface based on the output from the light detector, a first comparator for detecting the focus error signal level in excess of a first reference level as the defocus representing signal by comparing the focus error signal with the predetermined first reference level, an area weighted average reflected light intensity detector for detecting an area weighted average reflected light intensity from the disc surface based on the output from the light detector, a second comparator for comparing the area weighted average reflected light intensity with a predetermined second reference level, and a lens evacuator for driving the focus actuator to evacuate the objective lens from the disc surface when it is detected by the second comparator that the area weighted average reflected light intensity has decreased below the second reference level within a prescribed period of time after the defocus representing signal has been detected by the first comparator.

5 Claims, 7 Drawing Sheets

OPTICAL DISC REPRODUCING APPARATUS WITH MECHANICAL SHOCK DETECTION

FIELD OF THE INVENTION

The present invention relates to an optical disc reproducing apparatus such as a CD-ROM driver, and more particularly relates to an optical disc reproducing apparatus which employs a servo system for a laser pickup.

BACKGROUND OF THE INVENTION

On an optical disc reproducing apparatus, an objective lens of a laser pickup is servo-controlled to hold a proper distance from a disc surface so that an optical beam emitted from a laser pickup is focused on the disc surface with a proper light spot.

However, if an external mechanical shock is exerted to an optical disc reproducing apparatus, the level of a focus error signal may increase to a level which falls outside the effective focus servo range and normal restoration may become impossible or much time may be required for normal restoration. So, in a conventional optical disc reproducing apparatus, an area weighted average reflected light intensity from the disc surface obtained through each segment of a light detector is compared with a preset reference level (nearly a threshold level of a focus serve possible range) and if the area weighted average reflected light intensity is below the reference level for a relatively long period of time, it will be judged as a defocused state and the servo operation is once broken and the focus search is again carried out. Here, the reason for detecting the long duration of the reduction of the area weighted average reflected light intensity is to distinguish it from a sudden decrease of the area weighted average amount of reflected light caused by scratches on the disc surface.

Referring now to FIG. 8, the focus servo system of the conventional optical disc reproducing apparatus and its operation will be described in detail hereinafter.

In FIG. 9, a light emitted from a laser diode 1 is radiated to the disc D to make a light spot on an information bearing surface of the disc D by an objective lens 3 after passing through an optical system such as a beam splitter 2. Reflected light from the disc surface arrives at a plurality of segments in a light detector 4. The outputs from the segments of the light detector 4 are input to a focus error generator 5. This focus error generator 5 generates a focus error signal representing a vertical deviation of the focal point of the light beam from the disc surface based on the outputs from the segments of the light detector 4. The focus error signal is input to a phase compensator 7 via a servo switch 6 and is amplified by a driving amplifier 8 after the phase and gain adjustments made in the phase compensator 7 to stabilize the servo operation, and is supplied as a driving signal to a focus actuator 9 of the objective lens 3.

On the other hand, the outputs from the segments of the light detector 4 are input to an adder 10, where they are summed together. The output from the adder 10 is compared with a preset reference level in a sum signal comparator 11 and the result of this comparison is output to an FOK generator 12. The FOK generator 12 generates an FOK signal for controlling the ON/OFF of the focus servo operation by closing/opening the servo switch 6 according to the steps shown below.

FIGS. 7 and 8 are timing diagrams showing the operation of the FOK generator 12. Here, FIG. 7 shows a disc having scratches, while FIG. 8 shows the operation of the FOK generator 12 when a defocusing occurs due to external mechanical shocks. The servo switch 6 is turned ON for the period when the FOK signal is at the "H" level and is turned OFF for a period when it is at the "L" level.

As shown in FIGS. 7 and 8, the output from the sum signal comparator 11 becomes the "H" level when the sum of the outputs from the segments of the light detector 4 is above the reference level and becomes the "L" level, the FOK generator 12 starts a built-in timer A and after a predetermined period of time (T), checks the output level of the sum signal comparator 11 again. As a result of this recheck, if the output from the sum signal comparator 11 is at the "H" level, that is, an added level of the outputs from the light detectors returns above the reference level after the predetermined period of time (T), the FOK generator 12 keeps the FOK signal at the "H" level. Further, if the output from the added signal comparator 11 after the predetermined period of time (T) is at the "L" level, the FOK generator 12 decreases the FOK signal to the "L" level and breaks the focus servo operation by turning off the servo switch 6. Thereafter, the process goes to the sequences of returning the process to the pickup focus servo operation.

As described above, in a conventional optical disc reproducing apparatus, a sudden decrease of the area weighted average reflected light intensity due to scratches on a disc is a fleeting problem. In this case, therefore, the focus servo operation is continuously carried out and if the decrease of the area weighted average reflected light intensity continues for a relatively long period of time, the focus servo operation is broken by assuming that a defocusing has occurred.

However, this system requires a relatively long period of time to determine whether or not a defocusing has occurred. In the case where the defocus state is primarily caused by external mechanical shocks, the objective lens approaches too close the disc surface before the lens evacuation operation starts, and in the worst cases the objective lens collides with the disc surface.

As described above, on a conventional optical disc reproducing apparatus it is required to monitor the decrease of the area weighted average reflected light intensity for a relatively long period of time to distinguishing the defocus state caused by external mechanical shocks from those due to scratches on a disc. Therefore, if the defocusing is caused by external mechanical shocks, the objective lens might collide with the disc surface before any operation of evacuating the objective lens from the disc surface is performed.

This problem appears remarkably often especially on a reproducing apparatus for reproducing a disc (CD-ROM and the like) and a video disc having high recording density and high rotational speed.

SUMMARY OF THE INVENTION

It is, therefore, an object of the present invention to provide an optical disc reproducing apparatus capable of surely avoiding a collision of an objective lens with a disc surface by quickly detecting the defocusing caused by external mechanical shocks and evacuating the objective lens from the disc surface.

In order to achieve the object described above, an optical disc reproducing apparatus of the present invention has an objective lens for focusing light from the light source on a disc surface as a light spot, a focus actuator for driving the objective lens in the vertical direction to the disc surface, a light detector for converting the reflected light from the disc surface into an electric signal, a focus error signal generator for generating a focus error signal representing a vertical deviation of the focal point from the disc surface based on the output from the light detector, a first comparator for detecting the focus error signal level in excess of a first reference level as the defocus representing signal by comparing the focus error signal with the predetermined first reference level, an area weighted average reflected light intensity detector for detecting an area weighted average reflected light intensity from the disc surface based on the output from the light detector, a second comparator for comparing the area weighted average reflected light intensity with a predetermined second reference level, and a lens evacuator for driving the focus actuator to evacuate the objective lens from the disc surface when it is detected by the second comparator that the area weighted average reflected light intensity has decreased below the second reference level within a prescribed period of time after the defocus representing signal has been detected by the first comparator.

In the optical disc reproducing apparatus of the present invention, if the defocusing is caused by external mechanical shocks, etc., the event yields a relatively large focus error signal, and a decrease in the area weighted average reflected light intensity. The focus actuator evacuates the objective lens from the disc surface when it is detected that the area weighted average reflected light intensity has decreased below the second reference level within a prescribed period of time after the defocus state has been detected so it is possible to evacuate the objective lens from the disc surface by quickly detecting the defocusing caused by external mechanical shocks and thus, surely avoiding the collision of the objective lens with the disc surface.

Further, if an evacuating speed of the objective lens from the disc surface is set at a speed faster than the moving speed of the objective lens in the normal servo operation, the collision of the objective lens with the disc surface can be surely avoided.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Preferred embodiments of the present invention will be described in detail hereinafter in reference to the attached drawings 1 through 5.

Figure 1:
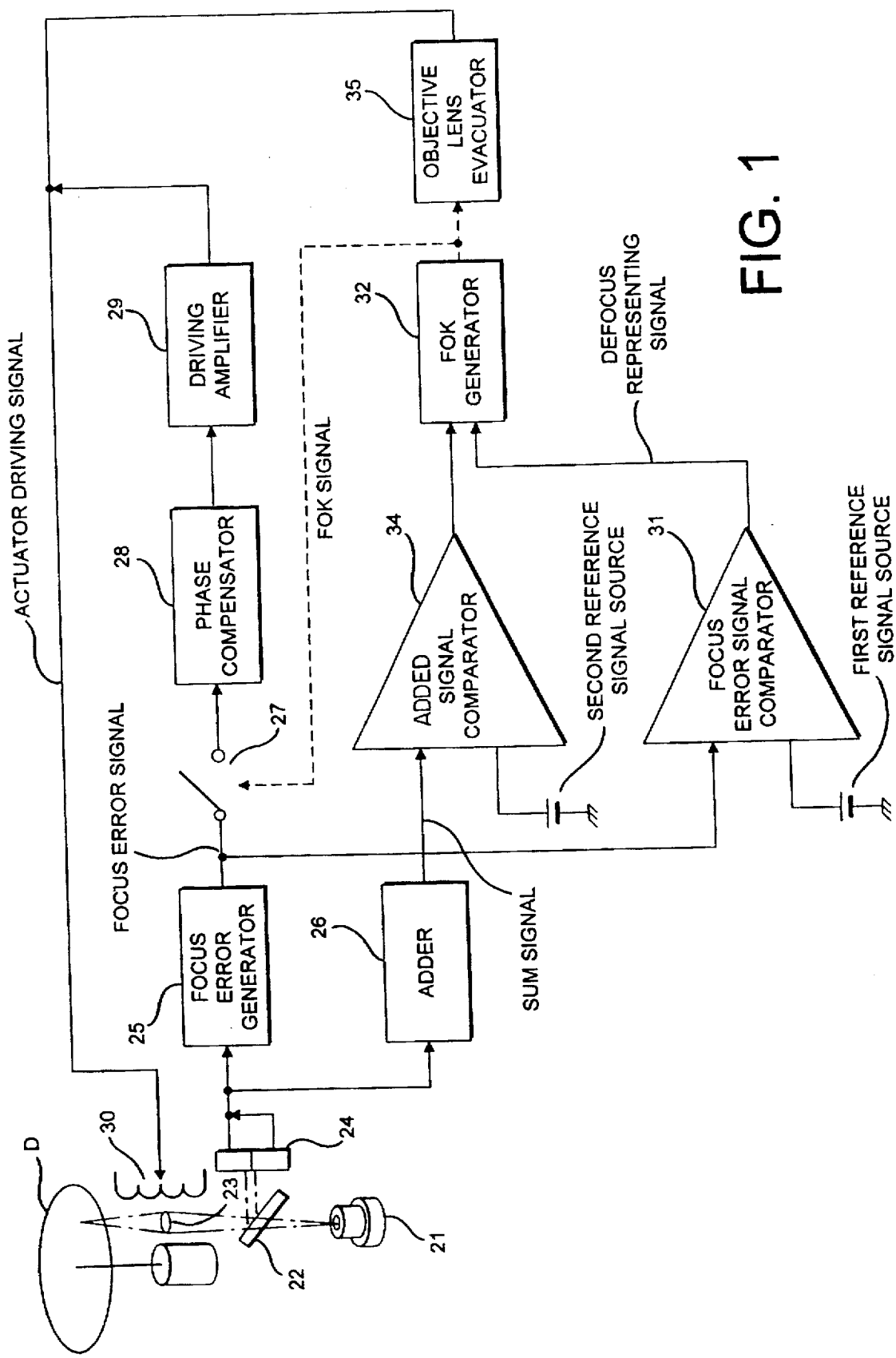
FIG. 1 is a block diagram showing the construction of a focus servo system of an optical disc reproducing apparatus according to one embodiment of the present invention.

FIG. 1 shows a construction of a focus servo system of an optical disc reproducing apparatus in one embodiment according to the present invention.

In FIG. 1 the light emitted from a laser diode 21 is radiated to the information bearing surface of a disc D as a light spot by an objective lens 23 after passing through a beam splitter 22, etc. The reflected light from the disc surface arrives at a plurality of segments of the light detector 24 after passing through the objective lens 23 and the beam splitter 23. The outputs from the segments of the light detector 24 are input to a focus error generator 25 and an adder 26. The focus error generator 25 generates a focus error signal representing a vertical deviation of the focal point of the light beam from the disc surface based on the signal detected by the light detector 24. The focus error signal is input to a phase compensator 28 through a servo switch 27, and after the phase and gain adjustments are made in the phase compensator 28 to stabilize the focus servo operation, its power is amplified by a driving amplifier 29 and the focus error signal is supplied to a focus actuator 30 of the objective lens 23.

Further, the focus error signal is also input to a focus error comparator 31. The focus error comparator 31 compares the focus error signal with a predetermined first reference level, and if the focus error signal is above the reference level, the focus error comparator 31 outputs a defocus representing signal to an FOK generator 32.

On the other hand, the detected signals of the light detectors 24 are input to the adder 28 where they are added up. The output from the adder 28 is compared with a predetermined second reference level in an added signal comparator 34 and the result of comparison is output to an FOK generator 32.

Figure 2:
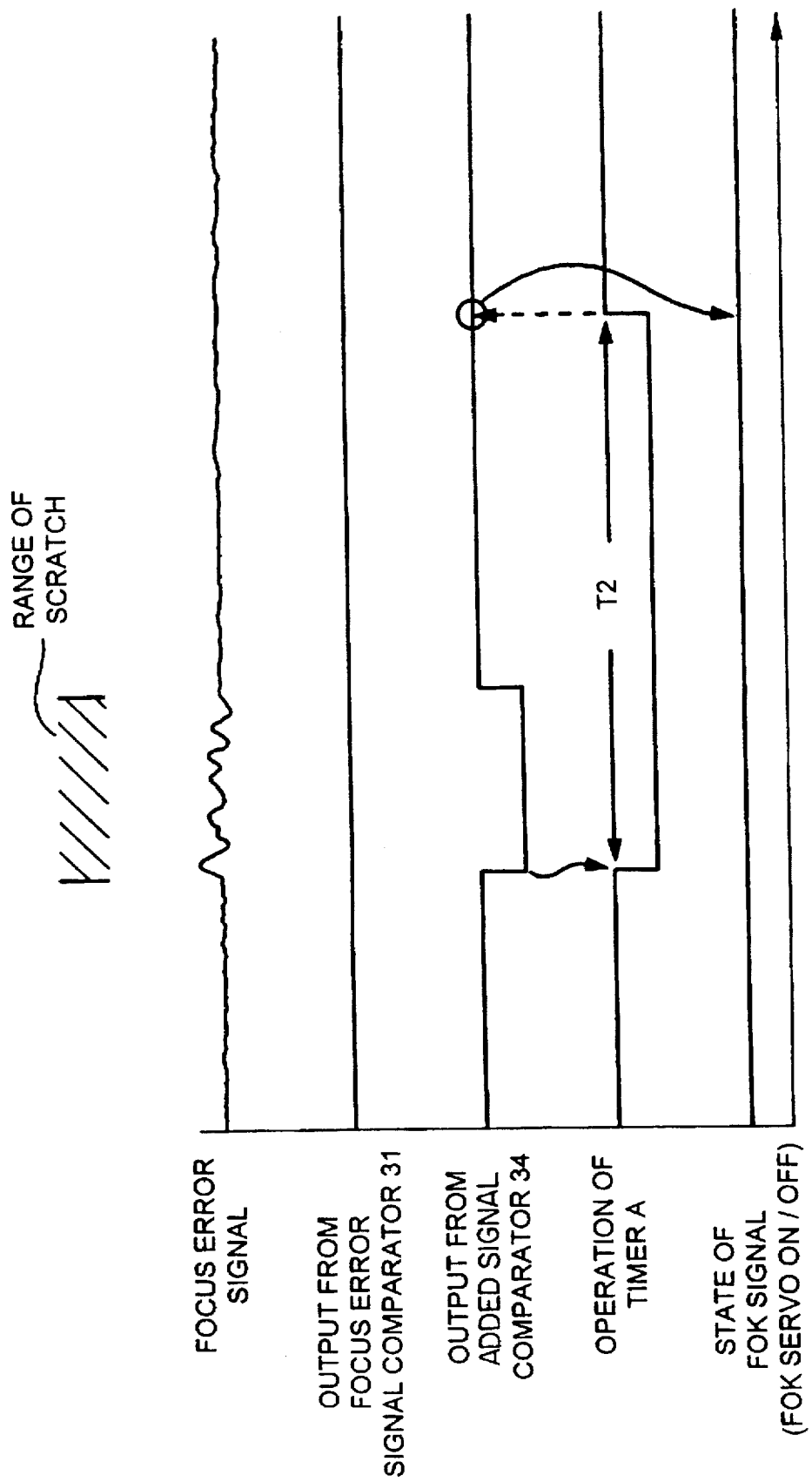
FIG. 2 is a timing diagram for explaining the operation of an FOK generator when a disc has scratches in the embodiment shown in FIG. 1.
Figure 3:
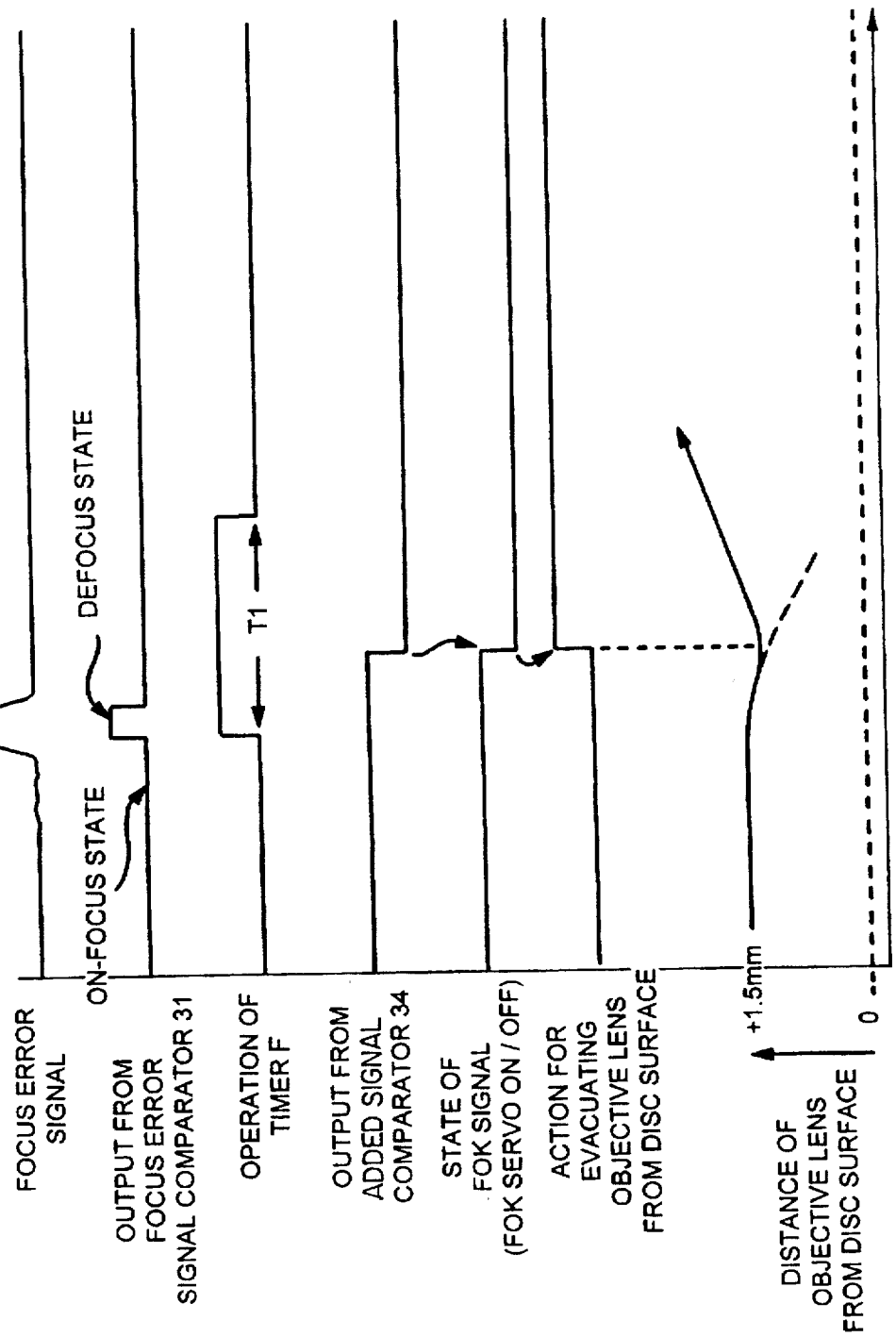
FIG. 3 is a timing diagram for explaining the operation of the FOK generator.

Referring now to FIGS. 2 and 3, the detailed operation of the FOK generator 32 will be described. FIG. 2 shows a case of a disc having scratches, while FIG. 3 shows a case where the defocusing is caused by external mechanical shocks, etc. Further, the servo switch 27 is kept ON for the period when the FOK signal is at the "H" level and is kept OFF for the period when it is at the "L" level.

As shown in the drawings, the focus error comparator 31 compares the focus error signal with a predetermined first reference level, and if the focus error signal is above the reference level, the focus error comparator 31 outputs an "H" level defocus representing signal to the FOK generator 32. When the defocus representing signal has been input, the FOK generator 32 starts built-in timer F. In addition, the added signal comparator 34 outputs an "H" level signal if the added level of the signals output from the segments of the light detector 24 is above the second reference and an "L" level signal when it is below the second reference level.

As shown in FIG. 3, when detecting that the output from the added signal comparator 34 becomes the "L" level within a predetermined period of time (T1) after the built-in timer F has started, the FOK generator 32 reduces the FOK signal to the "L" level and turns off the focus servo operation by turning off the servo switch 27. At the same time, that FOK signal is output to a lens evacuation signal generator 35. When the FOK signal level becomes the "L" level, the lens evacuation signal generator 35 supplies a prescribed driving signal, which is a lens evacuation signal to quickly evacuate the objective lens 23 from the disc surface, to the focus actuator 30. As a result, the objective lens 23 is quickly evacuated from the disc surface, thus avoiding collision of the objective lens 23 with the disc surface. Further, to prevent definitely the objective lens 23 from colliding with the disc surface, it is desirable that the evacuation speed of the objective lens 23 from the disc surface is faster than the maximum lens moving speed in the focus servo operation. Thereafter, the process goes to a process such as that for recovering the focus servo operation.

As described above, defocusing caused by external mechanical shocks yield a relatively large focus error signal and a decrease in the area weighted average reflected light intensity. An optical disc reproducing apparatus of the present invention recognizes the defocusing caused by external mechanical shocks by the focus error comparator 31, the added signal comparator 34 and the FOK generator 32, and immediately breaks the focus servo operation and, at the same time, evacuates the objective lens 23 from the disc surface.

On the other hand, if a disc has scratches, the area weighted average reflected light intensity decreases while the fluctuation of the focus error signal is kept relatively small, as shown in a FIG. 2. Therefore, the output from the added signal comparator 34 decreases to the "L" level without an output the defocus representing signal at the "H" level by the focus error comparator 31. Thus, when the output level of the added signal comparator 34 decreases to the "L" level while the defocus representing signal remains in the "L" level state, the FOK generator 32 starts built-in timer A from that point of time and again checks the output level of the added signal comparator 34 after a predetermined period of time (T2). If the area weighted average reflected light intensity decreases are due to scratches on a disc, this decrease of the area weighted average reflected light intensity is a fleeting problem, and during a predetermined period of time the added signal returns to a level above the second reference level (the output level of the added signal comparator 34 returns to the "H" level). In this case, therefore, the FOK generator 32 continues the focus servo operation with the FOK signal kept at the "H" level.

Thus, according to the embodiment of the present invention described above, if the defocusing is caused by external mechanical shocks, etc., the invention detects the defocusing according to the decrease in the area weighted average reflected light intensity within a predetermined period of time after a relatively large focus error signal has been produced, and the objective lens is quickly evacuated from the disc surface. So, the possibility of the objective lens colliding with the disc surface can be avoided.

Figure 4:
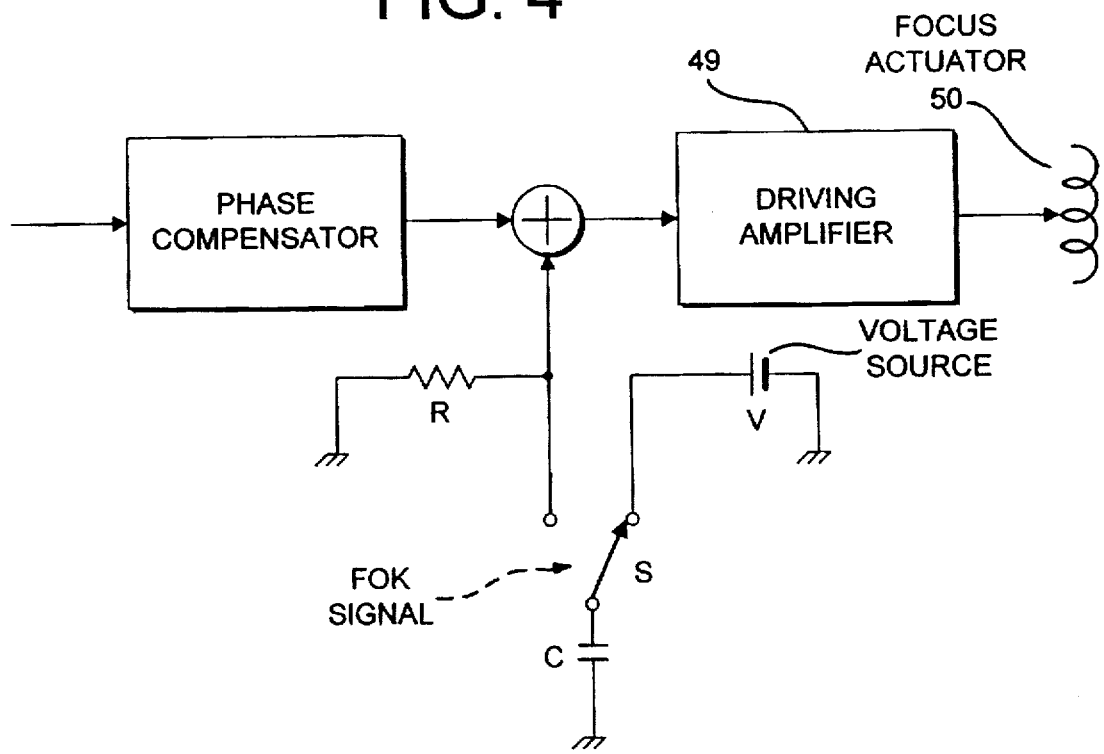
FIG. 4 is a block diagram showing the construction of a lens evacuation signal generator.
Figure 5:
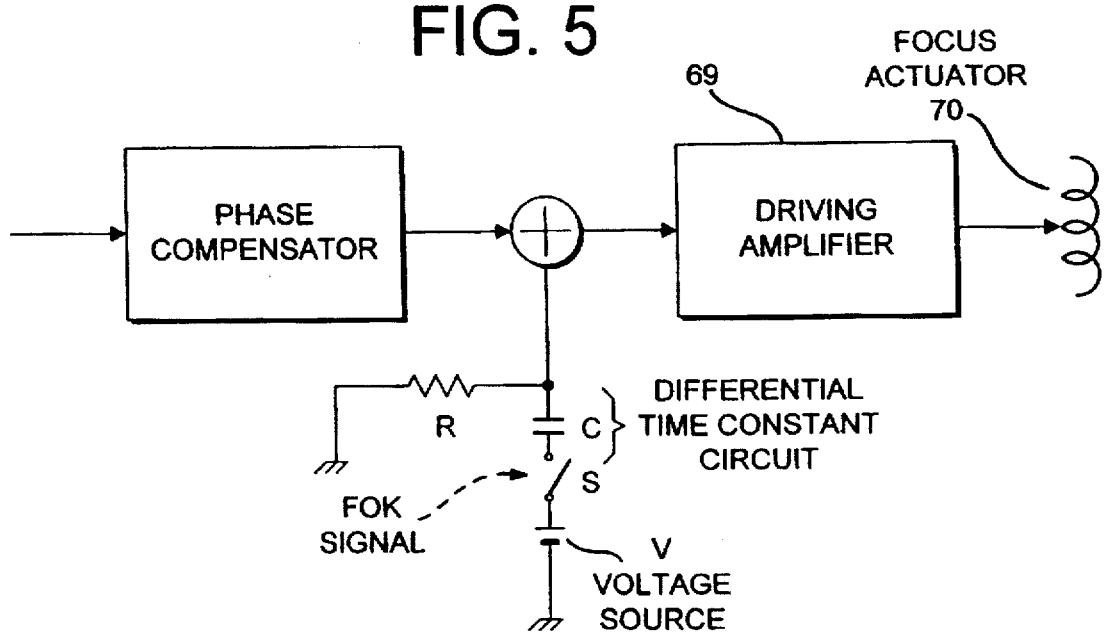
FIG. 5 is a block diagram showing the construction of another lens evacuation signal generator.
Figure 6:
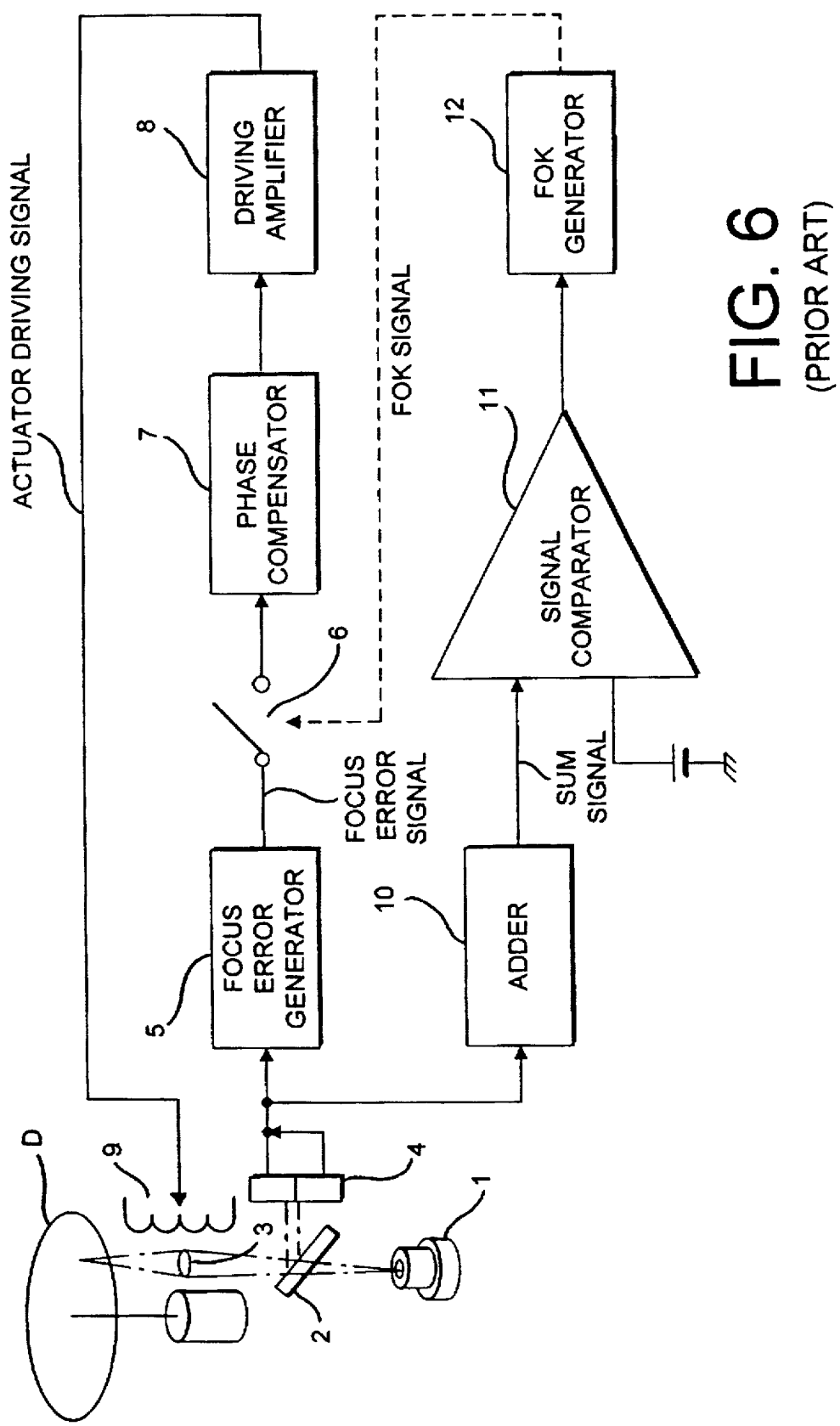
FIG. 6 is a block diagram showing the construction of a focus servo system of a conventional optical disc reproducing apparatus.
Figure 7:
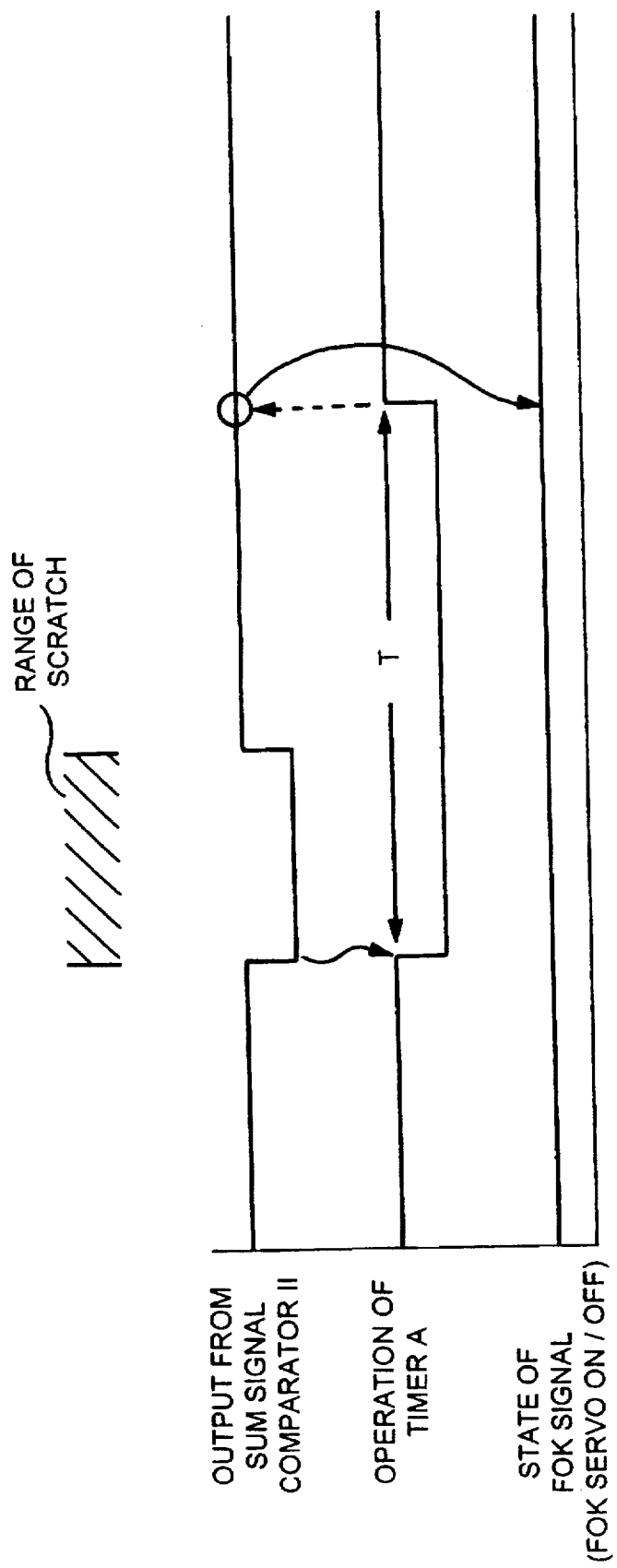
FIG. 7 is a timing diagram for explaining the operation of the FOK generator when a disc has scratches in the conventional apparatus shown in FIG. 6.
Figure 8:
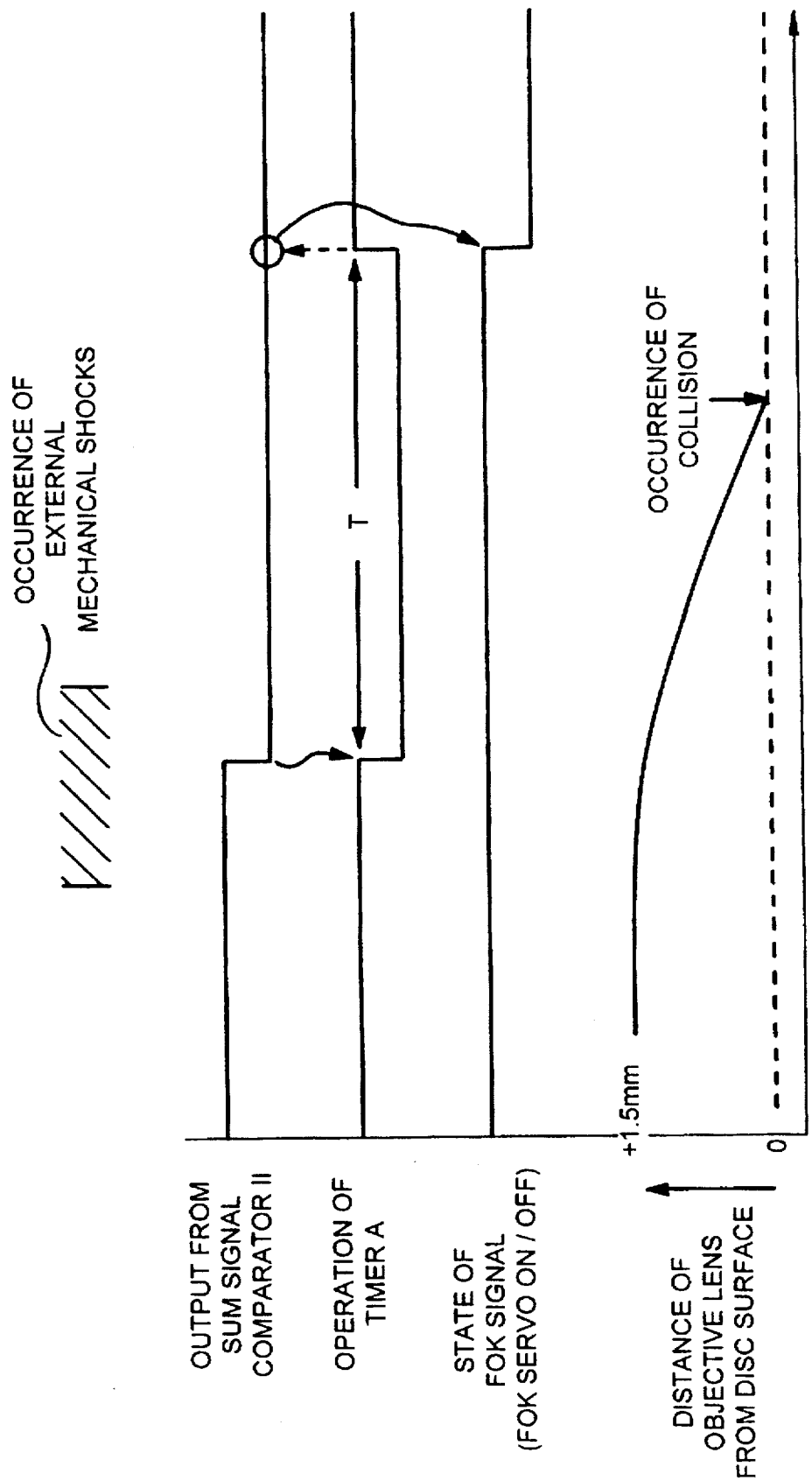
FIG. 8 is a timing diagram for explaining the operation of the FOK generator when the defocusing is caused by external mechanical shocks, etc. in the conventional apparatus shown in FIG. 6.

Referring now to FIGS. 4 and 5, another embodiment of the lens evacuation signal generator 53 will be described hereinafter.

In FIG. 4, C is a capacitor for supplying a driving amplifier 49 with a signal for performing the lens evacuation. A DC voltage source V has been connected selectably to this capacitor C via a switch S. The switch S changes the charge/discharge of the capacitor C by changing the connection of the capacitor C and selecting the terminal lead to the voltage source or the driving amplifier based on the FOK signal level. Then, if the defocusing is caused by external mechanical shocks, etc., and the FOK signal dropped to the "L" level, the capacitor C is connected to the driving amplifier through the switch S. As a result, the capacitor C is discharged through a resistor R, the discharge voltage is applied to the driving amplifier 49 and a driving signal, which is the lens evacuation signal to evacuate the objective lens 23 from the disc surface is supplied to a focus actuator 50. Further, in this construction, it is possible to set the lens evacuation sustaining duration as desired by arbitrarily setting the time consent given by the circuit of the capacitor C and the resistor R.

Further, FIG. 5 is an embodiment using a differential time constant circuit comprising the capacitor C and the resistor R. The voltage source V as been connected selectably to the differential time constant circuit through the switch S. The switch S is put in the closed state when the FOK signal becomes the "L" level, and the DC voltage source V is connected to the input of the driving amplifier 59 via the differential time constant circuit. As a result, a driving signal for evacuating the objective lens 23 from the disc surface is supplied to a focus actuator 70. Further, in this construction, the lens evacuation sustaining duration can be set as desired by a time constant which is retained by the differential time constant circuit.

As described above, according to an optical disc reproducing apparatus of the present invention, if the defocusing is caused by external mechanical shocks, etc., the event yields a relatively large focus error signal and the area weighted average reflected light intensity drops. A focus actuator actuates to evacuates the objective lens from the disc surface when the area weighted average reflected light intensity drops below a second reference level within a prescribed period of time after the defocus representing signal has been detected during the focus servo operation. It is therefore possible to evacuate the objective lens from the disc surface by quickly detecting defocusing caused by external mechanical shocks, and thus it becomes possible to avoid definitely the collision of the objective lens with the disc surface.

Further, if the evacuating speed of the objective lens from the disc surface is set at a speed faster than the moving speed of the objective lens in the normal reproducing operation, it becomes possible to avoid the collision of the objective lens with the disc surface.

As described above, the present invention can provide an extremely preferable optical disc reproducing apparatus.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example, for the purposes of a divisional application.

What is claimed is:

1. An optical disc reproducing apparatus comprising:

an objective lens for focusing a light beam from a light source on a disc surface as a light spot;

a focus actuator for driving the objective lens in the vertical direction to the disc surface;

a light detector for converting the reflected light from the disc surface into an electric signal;

a focus error signal generator for generating a focus error signal having a magnitude which represents a vertical deviation of the focal point from the disc surface;

a first comparator for comparing the magnitude of the focus error signal with a predetermined first reference level and outputting a defocus representing signal when the magnitude of the focus error signal exceeds the first reference level;

a reflected light intensity detector for detecting a reflected light intensity from the disc surface based on the output from the light detector;

a second comparator for comparing the reflected light intensity with a predetermined second reference level;

a signal monitor coupled to the first and second comparators for monitoring the time at which the reflected light intensity decreases below the second reference level and the time at which the defocus representing signal is outputted by the first comparator; and a lens evacuator for driving a focus actuator to evacuate the objective lens from the disc surface when the signal monitor detects that the reflected light intensity decreases below the second reference level in the second comparator within a prescribed period of time after the first comparator outputs the defocus representing signal.

2. An optical disc reproducing apparatus as claimed in claim 1, wherein the lens evacuator comprises:

a capacitor for supplying a signal for driving the focus actuator via a driving amplifier to evacuate the objective lens from the disc surface;

a voltage source for charging the capacitor;

a switch for charging or discharging the capacitor; and a controller for controlling the switch to discharge the capacitor when the signal monitor detects that the reflected light intensity has decreased below the second reference level within the prescribed period of time after the first comparator outputs the defocus representing signal.

3. An optical disc reproducing apparatus as claimed in claim 1, wherein the lens evacuator comprises:

a voltage source;

a differential time constant circuit having a capacitor for supplying a signal from the voltage source to drive the focus actuator and evacuate the objective lens from the disc surface via a driving amplifier;

a switch for selectively connecting the voltage source with the differential time constant circuit; and a controller for controlling the switch to connect the voltage source and the differential time constant circuit when the signal monitor detects that the reflected light intensity decreases below the second reference level within the prescribed period of time after the first comparator outputs the defocus representing signal.

4. An optical disc reproducing apparatus as claimed in any of claims 1 through 3 wherein an evacuating speed of the objective lens from the disc surface is faster than the moving speed of the objective lens in the normal reproducing operation.

5. An optical disc reproducing apparatus as claimed in claim 1 wherein the objective lens continues to focus the light beam from the light source on the disc surface when the focus error signal does not exceed the first reference level and the reflected light intensity increases above the second reference level within a prescribed second period of time after the reflected light intensity decreases below the second reference level.

* * * * *